(12) United States Patent
Ishizuka et al.

(10) Patent No.: US 12,555,721 B2
(45) Date of Patent: Feb. 17, 2026

(54) MULTILAYER CERAMIC CAPACITOR INCLUDING RAISED PORTION

(71) Applicant: Murata Manufacturing Co., Ltd., Nagaokakyo (JP)

(72) Inventors: Akira Ishizuka, Nagaokakyo (JP); Shinichi Kokawa, Nagaokakyo (JP); Yasuyuki Shimada, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 18/735,609

(22) Filed: Jun. 6, 2024

(65) Prior Publication Data

US 2024/0321519 A1  Sep. 26, 2024

Related U.S. Application Data

(63) Continuation of application No. 17/506,925, filed on Oct. 21, 2021, now Pat. No. 12,040,136.

(30) Foreign Application Priority Data

Nov. 6, 2020  (JP) .................. 2020-185814

(51) Int. Cl.
*H01G 4/232* (2006.01)
*H01G 4/012* (2006.01)
(Continued)

(52) U.S. Cl.
CPC ............. *H01G 4/232* (2013.01); *H01G 4/012* (2013.01); *H01G 4/248* (2013.01); *H01G 4/30* (2013.01)

(58) Field of Classification Search
CPC ........ H01G 4/232; H01G 4/012; H01G 4/248; H01G 4/30
See application file for complete search history.

(56) References Cited

U.S. PATENT DOCUMENTS

| 12,040,136 B2 * | 7/2024 | Ishizuka ................. H01G 4/248 |
| 2012/0320495 A1 * | 12/2012 | Akazawa ............... H01G 4/005 |
| | | 361/321.2 |

(Continued)

FOREIGN PATENT DOCUMENTS

| JP | 2004111489 A | * | 4/2004 |
| JP | 2016157904 A | * | 9/2016 |

OTHER PUBLICATIONS

Ishizuka et al., "Multilayer Ceramic Capacitor With Reduced Equivalent Series Inductance", U.S. Appl. No. 17/506,925, filed Oct. 21, 2021.

*Primary Examiner* — Timothy J. Dole
*Assistant Examiner* — Daniel M Dubuisson
(74) *Attorney, Agent, or Firm* — Keating & Bennett, LLP

(57) ABSTRACT

A multilayer ceramic capacitor includes end-surface external electrodes and side-surface external electrodes. The end-surface external electrodes are respectively provided at end surfaces of a multilayer body and are respectively connected to end-surface connecting internal electrodes. The side-surface external electrodes are respectively provided at the side surfaces of the multilayer body and respectively connected to side-surface connecting internal electrodes. The end-surface connecting internal electrodes each include end surface opposing portion opposing the side-surface connecting internal electrode adjacent in a lamination direction, and an end surface lead-out portion extending from the end surface opposing portion to one of the end-surface external electrodes. The side-surface connecting internal electrodes each include a side surface opposing portion opposing the end-surface connecting internal electrodes adjacent in the lamination direction, and a side surface lead-out portion extending from the side surface opposing portion to one of the side-surface external electrodes.

4 Claims, 18 Drawing Sheets

(51) Int. Cl.
*H01G 4/248* (2006.01)
*H01G 4/30* (2006.01)

(56) References Cited

U.S. PATENT DOCUMENTS

2015/0116897 A1* 4/2015 Sawada .................... H01G 4/12
361/301.4
2016/0104575 A1* 4/2016 Nakazawa ............. H01G 4/232
361/301.4

* cited by examiner

MULTILAYER CERAMIC CAPACITOR INCLUDING RAISED PORTION

CROSS REFERENCE TO RELATED APPLICATIONS

This application claims the benefit of priority to Japanese Patent Application No. 2020-185814 filed on Nov. 6, 2020. The entire contents of this application are hereby incorporated herein by reference.

BACKGROUND OF THE INVENTION

1. Field of the Invention

The present invention relates to a multilayer ceramic capacitor and a method of manufacturing the multilayer ceramic capacitor.

2. Description of the Related Art

A multilayer ceramic capacitor including many terminals includes a multilayer body in which layered dielectrics and layered internal electrodes are alternately laminated (stacked), and further includes end-surface external electrodes provided on both end portions in a longitudinal direction, and side-surface external electrodes provided on both side portions in a lateral direction.

The internal electrodes adjacent to each other in the lamination (stacking) direction differ in shape, and end-surface connecting internal electrodes and side-surface connecting internal electrodes are alternately laminated. The end-surface connecting internal electrodes each include an opposing portion where the internal electrodes adjacent to each other in the lamination direction oppose each other, and an end surface lead-out portion extending from the opposing portion in the longitudinal direction to be connected to the end-surface external electrode. The side-surface connecting internal electrodes each include an opposing portion where the internal electrodes adjacent to each other in the lamination direction oppose each other, and a side surface lead-out portion extending from the opposing portion in the width direction to be connected to the side-surface external electrode.

That is, in the multilayer ceramic capacitor, electrode portions defining and functioning as the opposing portions are alternately provided in the region where the opposing portions of the adjacent internal electrodes are provided in the lamination direction (refer to Japanese Unexamined Patent Application Publication No. 2016-127262).

However, with regard to such a multilayer ceramic capacitor, in the region where these lead-out portions are provided, the two internal electrodes in which the lead-out portions extend in the same direction are laminated in the lamination direction in the order of the lead-out portion, the dielectric, and the lead-out portion. While, in the region where the opposing portions are provided, the two internal electrodes are laminated in the lamination direction in the order of the opposing portion, the dielectric, the internal electrode of which the lead-out portion extends in the other direction, the dielectric, and the opposing portion. In other words, the distance between the lead-out portions of the two internal electrodes are shorter than the distance between the opposing portions thereof.

As a result, when the distance between lead-out electrodes is short in the multilayer ceramic capacitor, the influence of the equivalent series inductance (ESL) sometimes cannot be ignored.

SUMMARY OF THE INVENTION

Preferred embodiments of the present invention provide multilayer ceramic capacitors that each make it possible to lower an equivalent series inductance (ESL), and methods of manufacturing such multilayer ceramic capacitors.

A preferred embodiment of the present invention provides a multilayer ceramic capacitor including a multilayer body including two end surfaces opposing in a length direction intersecting a lamination direction, two side surfaces opposing in a width direction intersecting the lamination direction and the length direction, internal electrodes including end-surface connecting internal electrodes and side-surface connecting internal electrodes alternately provided with each other in the lamination direction, and dielectrics alternately laminated with the plurality of internal electrodes in the lamination direction, end-surface external electrodes which are respectively provided at the two end surfaces of the multilayer body and to which the end-surface connecting internal electrodes are connected, and side-surface external electrodes which are respectively provided at the two side surfaces of the multilayer body and to which the side-surface connecting internal electrodes are connected. The multilayer ceramic capacitor further includes two main surfaces opposing each other in the lamination direction. The end-surface connecting internal electrodes each include an end surface opposing portion opposing the side-surface connecting internal electrodes adjacent in the lamination direction, and an end surface lead-out portion extending from the end surface opposing portion to one of the end-surface external electrodes. The side-surface connecting internal electrodes each include a side surface opposing portion opposing the end-surface connecting internal electrodes adjacent in the lamination direction, and a side surface lead-out portion extending from the side surface opposing portion to one of the side-surface external electrodes. A distance between the side surface lead-out portions in the lamination direction is larger than a distance between the side surface opposing portions in the lamination direction.

According to a preferred embodiments of the present invention, it is possible to provide multilayer ceramic capacitors that each make it possible to lower the equivalent series inductance (ESL), and methods of manufacturing such multilayer ceramic capacitors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

First Preferred Embodiment

Hereinafter, a multilayer ceramic capacitor 1 according to a first preferred embodiment of the present invention will be described.

Figure 1:
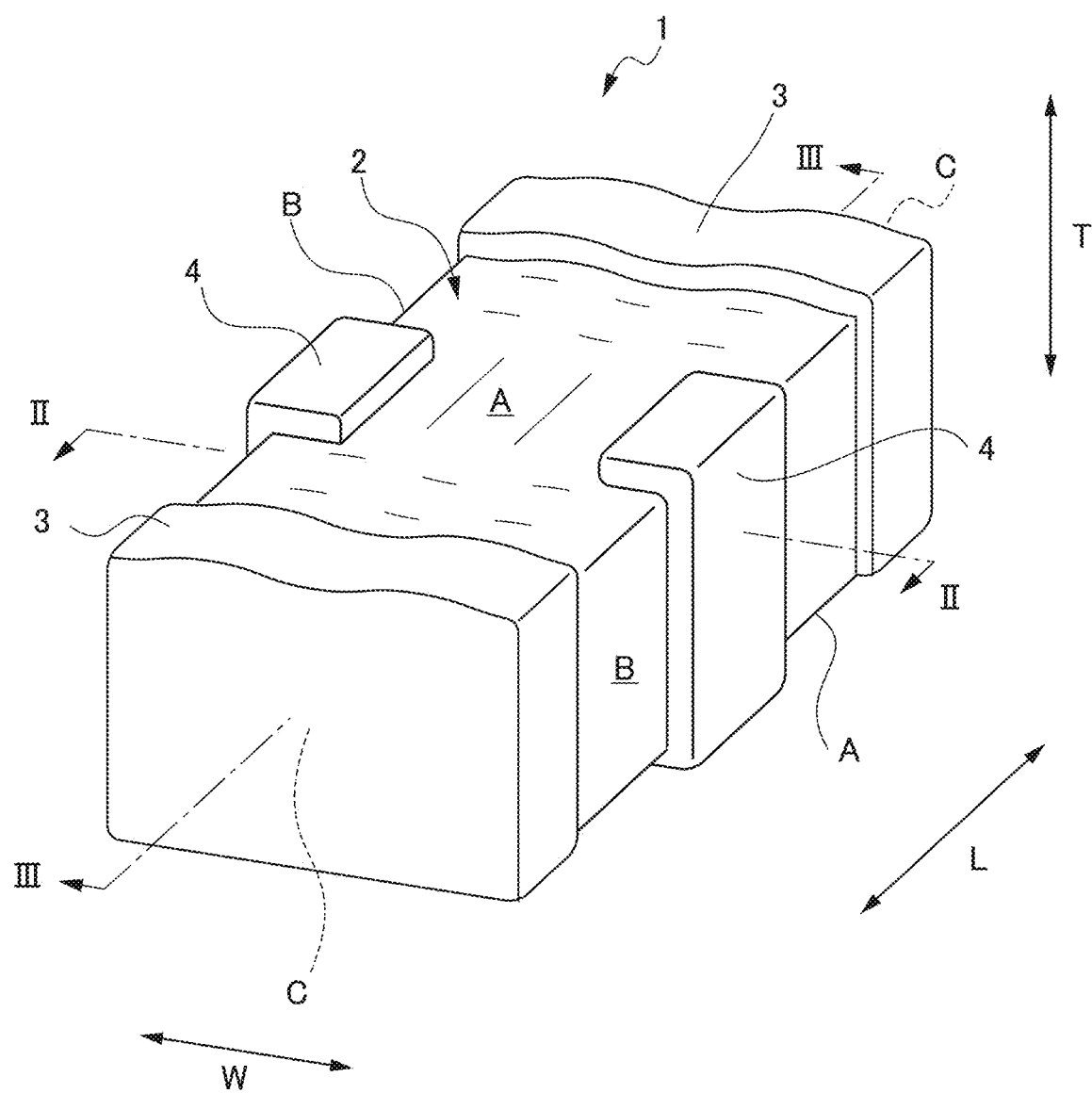
FIG. 1 is a schematic perspective view of a multilayer ceramic capacitor 1 according to a first preferred embodiment of the present invention.
Figure 2:
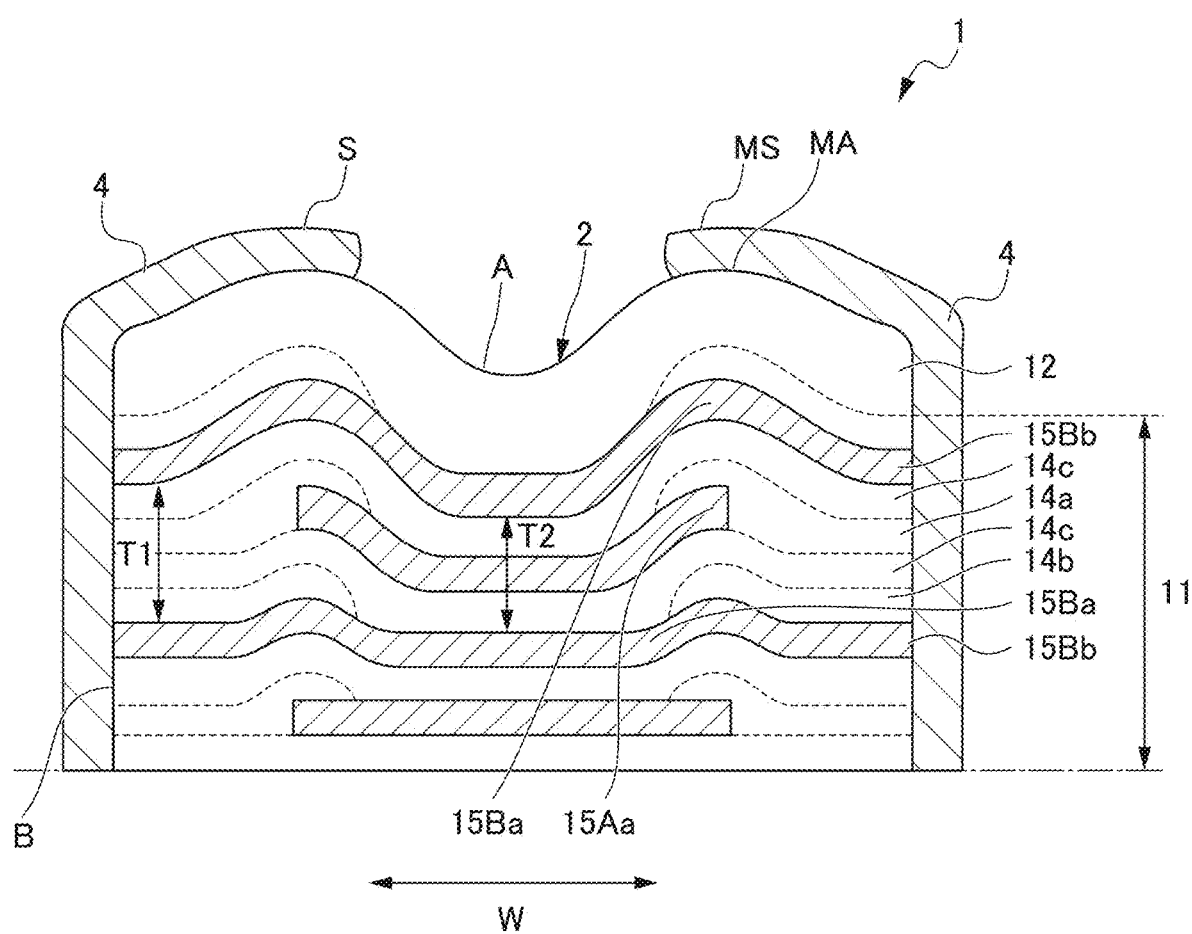
FIG. 2 is a cross-sectional view taken along the line II-II in FIG. 1 of the multilayer ceramic capacitor 1, and shows an upper half from a middle portion in a lamination direction T.
Figure 3:
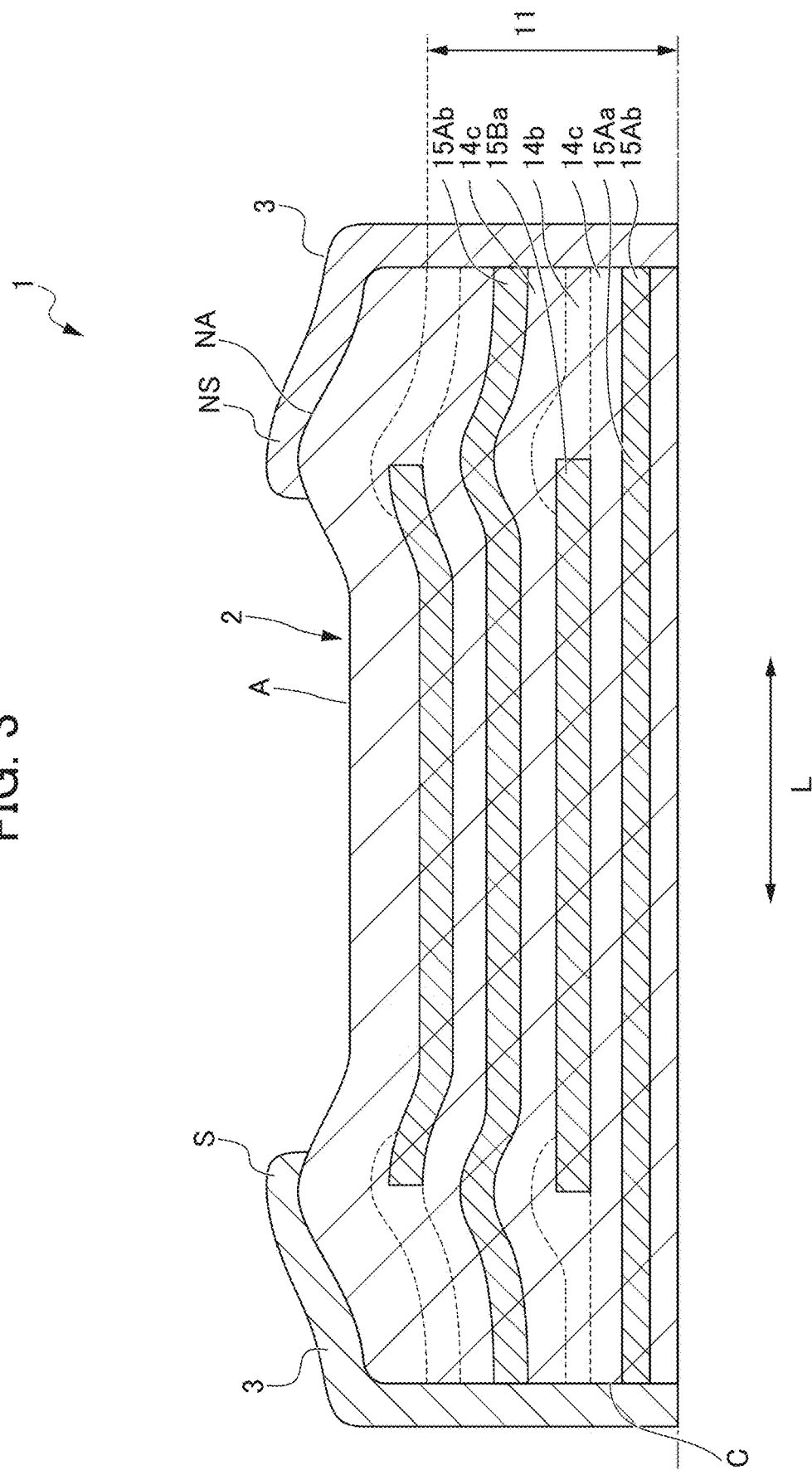
FIG. 3 is a cross-sectional view taken along the line III-III in FIG. 1 of the multilayer ceramic capacitor 1, and shows the upper half from the middle portion in the lamination direction T.

FIG. 1 is a schematic perspective view of a multilayer ceramic capacitor 1. FIG. 2 is a cross-sectional view taken along the line II-II in FIG. 1 of the multilayer ceramic capacitor 1, and shows an upper half from a middle portion in the lamination direction T. FIG. 3 is a cross-sectional view taken along the line III-III in FIG. 1 of the multilayer ceramic capacitor 1, and shows the upper half from the middle portion in the lamination direction T.

Multilayer Ceramic Capacitor 1

The multilayer ceramic capacitor 1 includes end-surface external electrodes 3 provided on two end surfaces C in a length direction L of a multilayer body 2, and side-surface external electrodes 4 provided on two side surfaces B in a width direction W of the multilayer body 2. The multilayer body 2 includes an inner layer portion 11 including a plurality of sets of a layered dielectric 14 and a layered internal electrode 15, and an outer layer portion 12.

In the present disclosure, as terms representing the orientation of the multilayer ceramic capacitor 1, in the multilayer ceramic capacitor 1, a direction in which the dielectric 14 and the internal electrode 15 are laminated is defined as a lamination direction T. A direction which intersects the lamination direction T and in which a pair of external electrodes 3 are provided is defined as a length direction L. A direction intersecting both the length direction L and the lamination direction T is defined as a width direction W. In the present preferred embodiment, the lamination direction T, the length direction L, and the width direction W are perpendicular or substantially perpendicular to each other.

FIG. 2 is a WT cross-section (first cross-section) passing through the width direction W and the lamination direction T of the multilayer ceramic capacitor 1. FIG. 3 is an LT cross-section (second cross-section) passing through the length direction L and the lamination direction T of the multilayer ceramic capacitor 1.

Furthermore, in the following description, among six outer surfaces of the multilayer body 2, a pair of outer surfaces opposing each other in the lamination direction T are defined as multilayer body main surfaces A, a pair of outer surfaces opposing each other in the width direction W are defined as side surfaces B, and a pair of outer surfaces opposing each other in the length direction L are defined as end surfaces C.

Multilayer Body 2

The multilayer body 2 includes an inner layer portion 11, and outer layer portions 12 provided on two sides in the lamination direction T of the inner layer portion 11. The multilayer body 2 preferably includes rounded corner portions and rounded ridge line portions. The corner portion is a portion where the three surfaces of the multilayer body intersect, and the ridge line portion is a portion where the two surfaces of the multilayer body intersect.

Inner Layer Portion 11

The inner layer portion 11 includes a stack in which the plurality of dielectrics 14 and the plurality of internal electrodes 15 are laminated in the lamination direction T.

Dielectric 14

The dielectrics 14 are each made of a ceramic material. As the ceramic material, for example, a dielectric ceramic containing $BaTiO_3$ as a main component is used. Furthermore, as the ceramic material, those obtained by adding at least one sub-component such as, for example, Mn compound, Fe compound, Cr compound, Co compound, and Ni compound to these main components may be used.

The dielectrics 14 include a dielectric 14c manufactured by a ceramic green sheet 114, which will be described later, and a dielectric 14a and a dielectric 14b manufactured by a conductive paste applied on the ceramic green sheet 114.

Internal Electrode 15

The internal electrodes 15 are each preferably made of a metallic material such as Ni, Cu, Ag, Pd, Ag—Pd alloy, Au, or other materials, for example.

The internal electrodes 15 each include a plurality of end-surface connecting internal electrode 15A and a plurality of side-surface connecting internal electrode 15B which are alternately provided with each other. When it is not necessary to explain by particularly distinguishing between the end-surface connecting internal electrode 15A and the side-surface connecting internal electrode 15B, they will be collectively described as an internal electrode 15.

Figure 4:
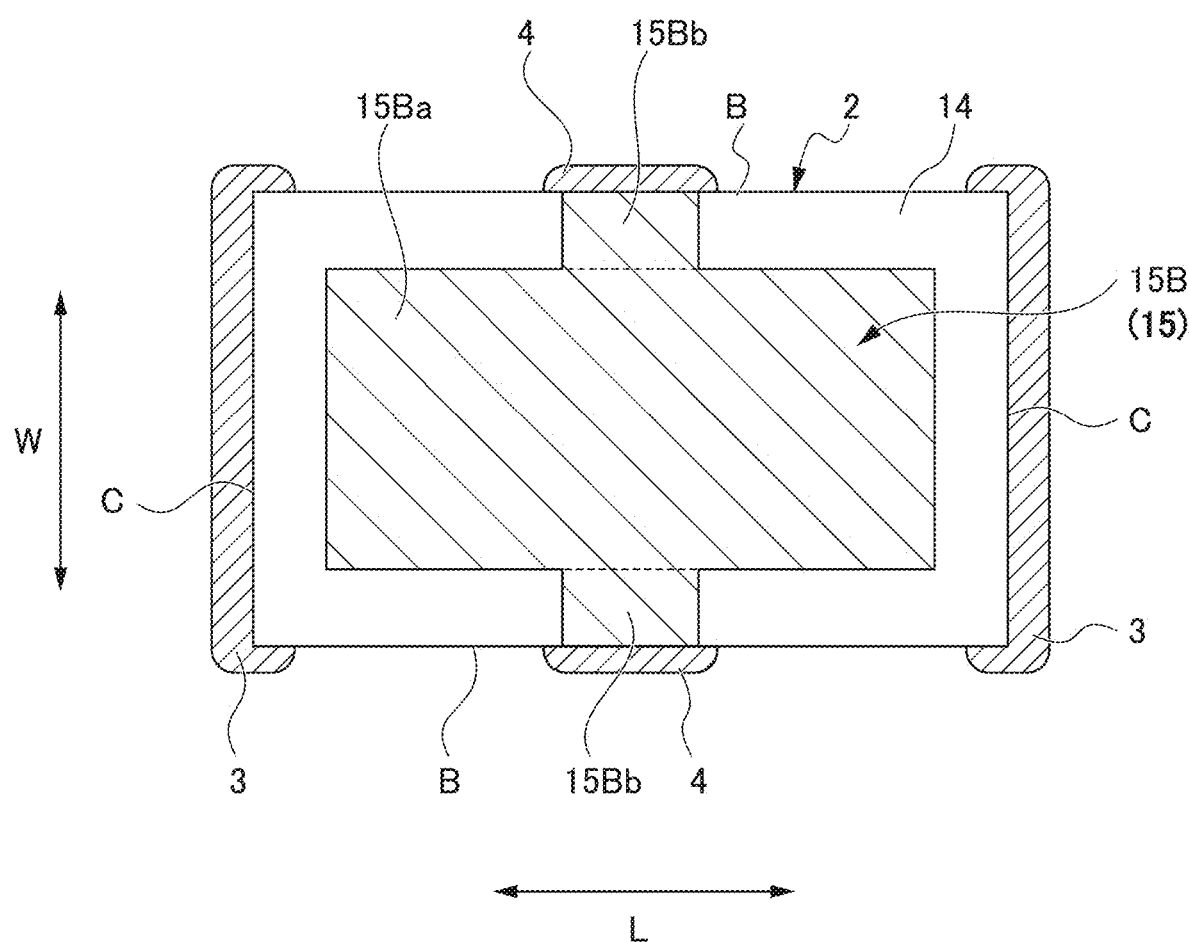
FIG. 4 is a cross-sectional view taken along a side-surface connecting internal electrode 15B of the multilayer ceramic capacitor 1.
Figure 5:
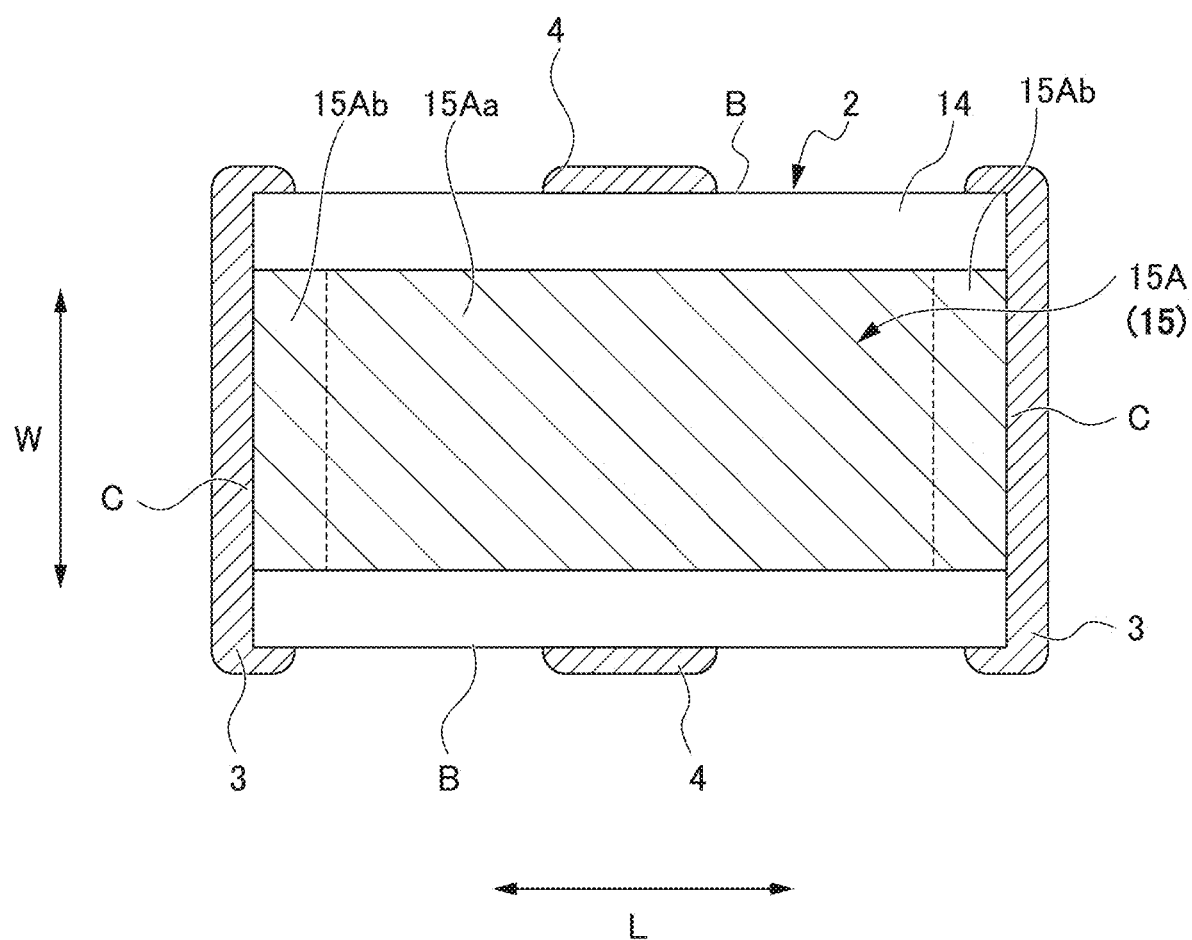
FIG. 5 is a cross-sectional view taken along an end-surface connecting internal electrode 15A of the multilayer ceramic capacitor 1.

FIG. 4 is a cross-sectional view taken along a side-surface connecting internal electrode 15B of the multilayer ceramic capacitor 1. FIG. 5 is a cross-sectional view taken along an end-surface connecting internal electrode 15A of the multilayer ceramic capacitor 1.

Side Surface Connecting Internal Electrode 15B

As shown in FIG. 4, the side-surface connecting internal electrode 15B is preferably smaller than the multilayer body 2, and includes a side surface opposing portion 15Ba and side surface lead-out portions 15Bb. The side surface opposing portion 15Ba has a rectangular or substantially rectangular shape, and each side thereof is spaced apart from the end surfaces C and the side surfaces B at a predetermined, for example, constant distance. The side surface lead-out portions 15Bb extend from the side surface opposing portion 15Ba toward the respective side surfaces B.

The side surface lead-out portions 15Bb extending to both side surfaces B are exposed at the respective side surfaces B of the multilayer body 2, and are connected to the respective side-surface external electrodes 4 provided on both sides of the multilayer body 2 in the width direction W.

End Surface Connecting Internal Electrode 15A

As shown in FIG. 5, the end-surface connecting internal electrode 15A extends between the two end surfaces C in the length direction L of the multilayer body 2 overall. The end-surface connecting internal electrode 15A has a rectangular or substantially rectangular shape, and is spaced apart from the both side surfaces B in the width direction w at a predetermined, for example, constant distance.

The end-surface connecting internal electrode 15A includes an end surface opposing portion 15Aa and end surface lead-out portions 15Ab. The end surface opposing portion 15Aa refers to a middle portion spaced apart from the both end surfaces C at a predetermined, for example, constant distance. The end surface lead-out portions 15Ab refer to portions extending from the end surface opposing portion 15Aa to both end surface C.

The end surface lead-out portions 15Ab extend to the respective end surfaces C, and exposed at the respective end surfaces C of the multilayer body 2. The end surface lead-out portions 15Ab are respectively connected to the end-surface external electrodes 3 provided on both sides in the width-direction W of the multilayer body 2.

The end surface opposing portion 15Aa and the side surface opposing portion 15Ba are opposed to each other to define a capacitor portion.

Outer Layer Portion 12

With reference to FIGS. 2 and 3, the outer layer portion 12 is a dielectric layer preferably having a predetermined, for example, constant thickness, and provided in the vicinity of the multilayer body main surface A of the inner layer portion 11. The outer layer portion 12 is made of the same or substantially the same material as the dielectric 14 of the inner layer portion 11.

External Electrode 3

The end-surface external electrodes 3 are provided on the respective end surface C of the multilayer body 2. The end surface lead-out portions 15Ab of the end-surface connecting internal electrodes 15A are connected to the respective end-surface external electrodes 3. The end-surface external electrodes 3 each cover not only the end surface C, but also portions of the multilayer body main surface A and the side surface B in the vicinity of the end surface C.

The side-surface external electrodes 4 are provided on two side surfaces B of the multilayer body 2. The side surface lead-out portions 15Bb of the side-surface connecting internal electrode 15B are connected to the respective side-surface external electrodes 4. The side-surface external electrodes 4 each cover not only the side surface B, but also a portion of the multilayer body main surface A in the vicinity of the end surface B.

In the present preferred embodiment, as shown in FIG. 2, a distance T1 between the side surface lead-out portions 15Bb adjacent to each other in the lamination direction T is preferably larger than a distance T2 between the side surface opposing portions 15Ba adjacent to each other in the lamination direction T.

According to the present preferred embodiment, the distance between the side surface lead-out portions 15Bb is larger than the distance between the side surface opposing portions 15Ba by the ceramic paste, such that it is possible to reduce the equivalent series inductance (ESL).

Furthermore, as shown in FIG. 2, in the WT cross-section (first cross-section) passing through the width direction W and the lamination direction T at the middle portion in the length direction L, the multilayer ceramic capacitor 1 includes multilayer body side surface-raised portions MA, each of which is raised toward the side surface B from the middle portion in the width direction W on the multilayer body main surface A.

The multilayer body side surface-raised portions MA are each provided at a portion on the multilayer body main surface A where both end portions of the side surface opposing portion 15Ba and the end surface opposing portion 15Aa in the width direction W are located inside in the lamination direction T, and extend in the length direction L on the multilayer body main surface A.

Since the multilayer body 2 includes the multilayer body side surface-raised portions MA, when viewed as the multilayer ceramic capacitor 1, main surfaces S each also include a side surface-raised portion MS which is raised toward the side surface B from the middle portion in the width direction W.

The side surface-raised portions MS are each provided at a portion on the main surface S where both end portions of the side surface opposing portion 15Ba and the end surface opposing portion 15Aa in the width direction W are located inside in the lamination direction T, and extend in the length direction L on the main surface S.

Furthermore, as shown in FIG. 3, in the LT cross-section (second cross-section) passing through the length direction L and the lamination direction T at the middle portion in the width direction W, the multilayer ceramic capacitor 1 includes multilayer body end surface-raised portions NA, each of which is raised toward the end surface C from the middle portion in the length direction L on the multilayer body main surface A.

The multilayer body end surface-raised portions NA are each provided at a portion on the multilayer body main surface A where both end portions of the side surface opposing portion 15Ba and the end surface opposing portion 15Aa in the length direction L are located inside in the lamination direction T, and extend in the width direction W on the multilayer body main surface A.

Since the multilayer body 2 includes the multilayer body end surface-raised portions NA, when viewed as the multilayer ceramic capacitor 1, main surfaces S each also include an end surface-raised portion NS which is raised toward the end surface C from the middle portion in the length direction L.

The end surface-raised portions NS are each provided at a portion on the main surface S where both end portions of the side surface opposing portion 15Ba and the end surface opposing portion 15Aa in the width direction W are located inside in the lamination direction T, and extend in the width direction W on the main surface S.

For example, in a multilayer ceramic capacitor for comparison, in a case in which the outer peripheral portion is thinner than the middle portion, when the multilayer ceramic capacitor is provided on a board, the multilayer ceramic capacitor is likely to swing left and right or front and back, and thus, the posture is not stable.

However, according to the multilayer ceramic capacitor 1 of the present preferred embodiment, the end surface-raised portion NS which is raised toward the end surface C from the middle portion and the side surface-raised portion MS which is raised toward the side surface B from the middle portion are provided on the main surface S. This configuration makes it possible to stabilize the posture of the multilayer ceramic capacitor without causing the multilayer ceramic capacitor to swing in any direction of left, right, front, or back when provided on a board.

Furthermore, there is also a possibility that moisture or water vapor infiltrates from the boundary portion between the external electrode 4 and the multilayer body 2. However, the external electrode 4 in the present preferred embodiment covers not only the side surface B, but also extends to the multilayer body main surface A and covers the portion of the multilayer body raised portion MA.

Therefore, even when moisture infiltrates the boundary portion between the multilayer body 2 and the external electrode 4, since the multilayer body raised portion MA is provided, it is difficult for moisture to migrate over the multilayer body raised portion MA and around the side surface B, and to infiltrate the internal electrode 15. Therefore, the infiltration of moisture into the boundary portion between the internal electrode 15 and the dielectric 14 is reduced or prevented.

Furthermore, there is also a possibility that moisture or water vapor also infiltrates from the boundary portion between the external electrode 3 and the multilayer body 2. However, the external electrode 3 in the present preferred embodiment covers not only the end surface C, but also extends to the multilayer body main surface A and covers the portion of the multilayer body raised portion NA.

Therefore, even when moisture infiltrates the boundary portion between the multilayer body 2 and the external electrode 3, since the multilayer body raised portion NA is provided, it is difficult for moisture to migrate over the multilayer body raised portion NA and around the end surface C, and to infiltrate the internal electrode 15. Therefore, the infiltration of moisture into the boundary portion between the internal electrode 15 and the dielectric 14 is reduced or prevented.

Method of Manufacturing Multilayer Ceramic Capacitor 1

Next, a non-limiting example of a method of manufacturing the multilayer ceramic capacitor 1 of the first preferred embodiment will be described.

Figure 6:
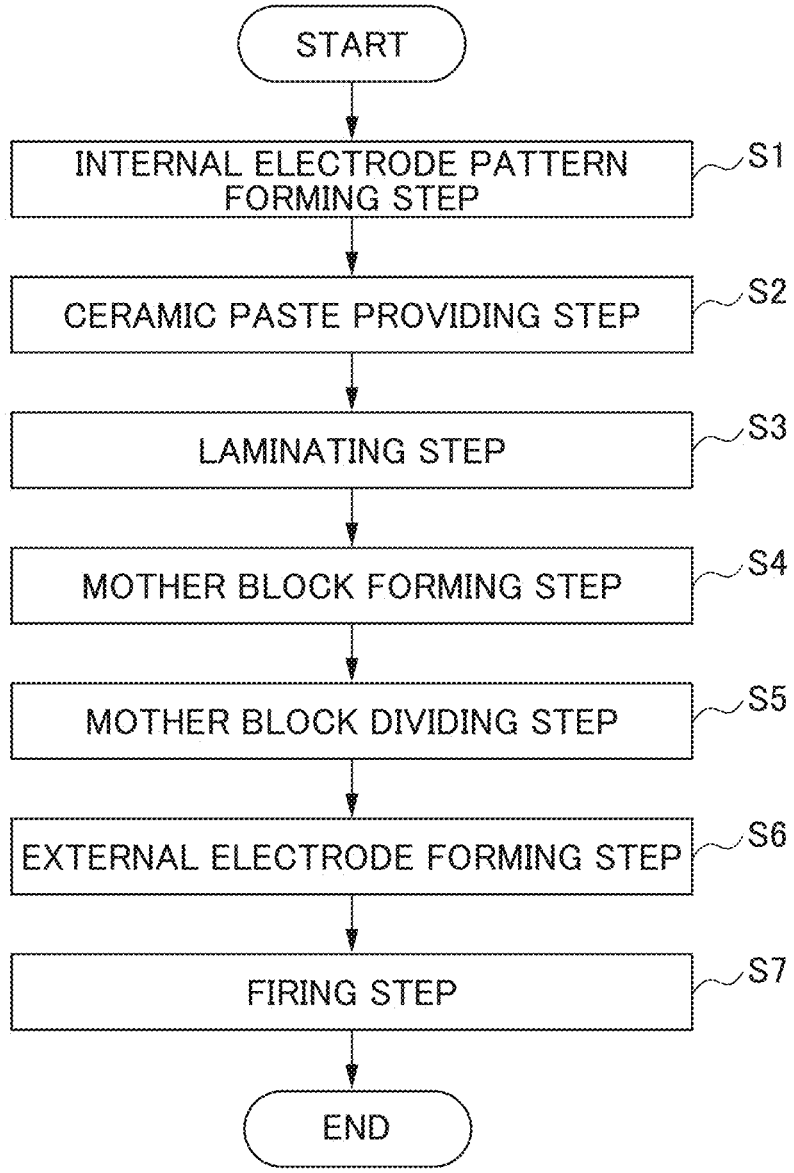
FIG. 6 provides a flowchart showing a method of manufacturing the multilayer ceramic capacitor 1 according to a first preferred embodiment of the present invention.

FIG. 6 provides a flowchart showing a method of manufacturing the multilayer ceramic capacitor 1. FIGS. 7 to 12 are process diagrams explaining the method of manufacturing the multilayer ceramic capacitor 1.

Internal Electrode Pattern Forming Step S1

Figure 7:
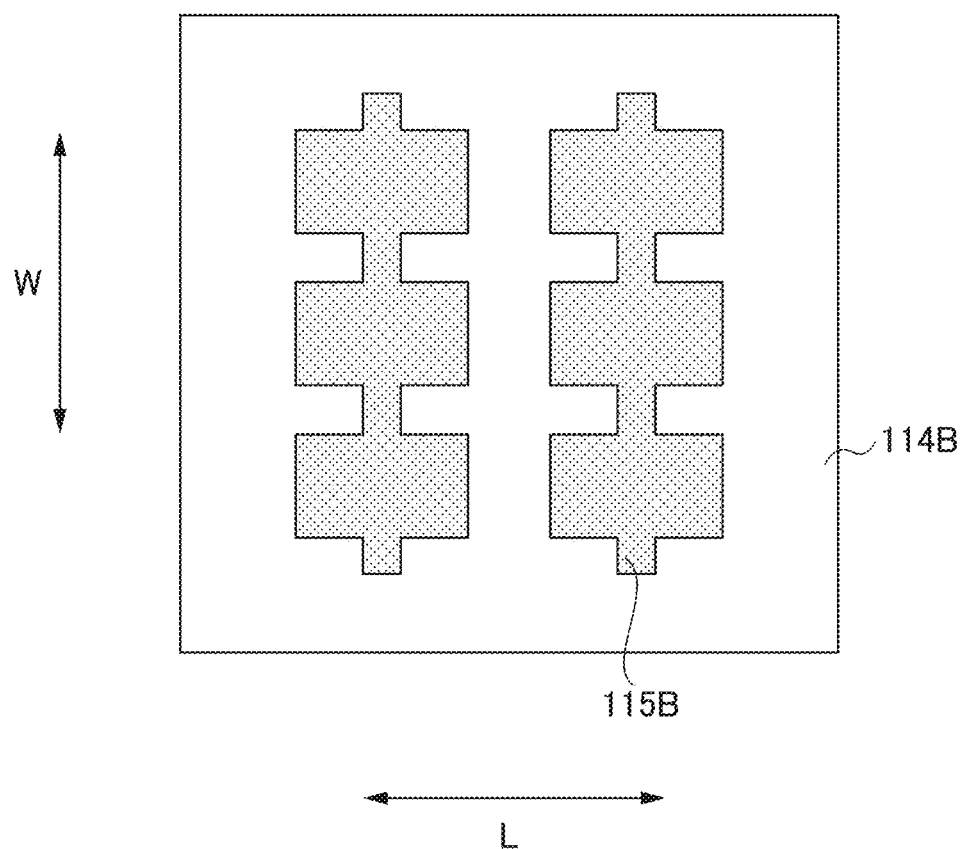
FIG. 7 is a process diagram explaining the method of manufacturing the multilayer ceramic capacitor 1.

First, as shown in FIG. 7, side-surface connecting internal electrode patterns 115B defining and functioning as the side-surface connecting internal electrode 15B are formed by a conductive paste on a second ceramic green sheet 114B defining and functioning as the dielectric 14c.

The side-surface connecting internal electrode patterns 115B each have a shape in which a plurality of side-surface connecting internal electrodes 15B are continuous in the width direction W, but not continuous in the length direction L.

Figure 8:
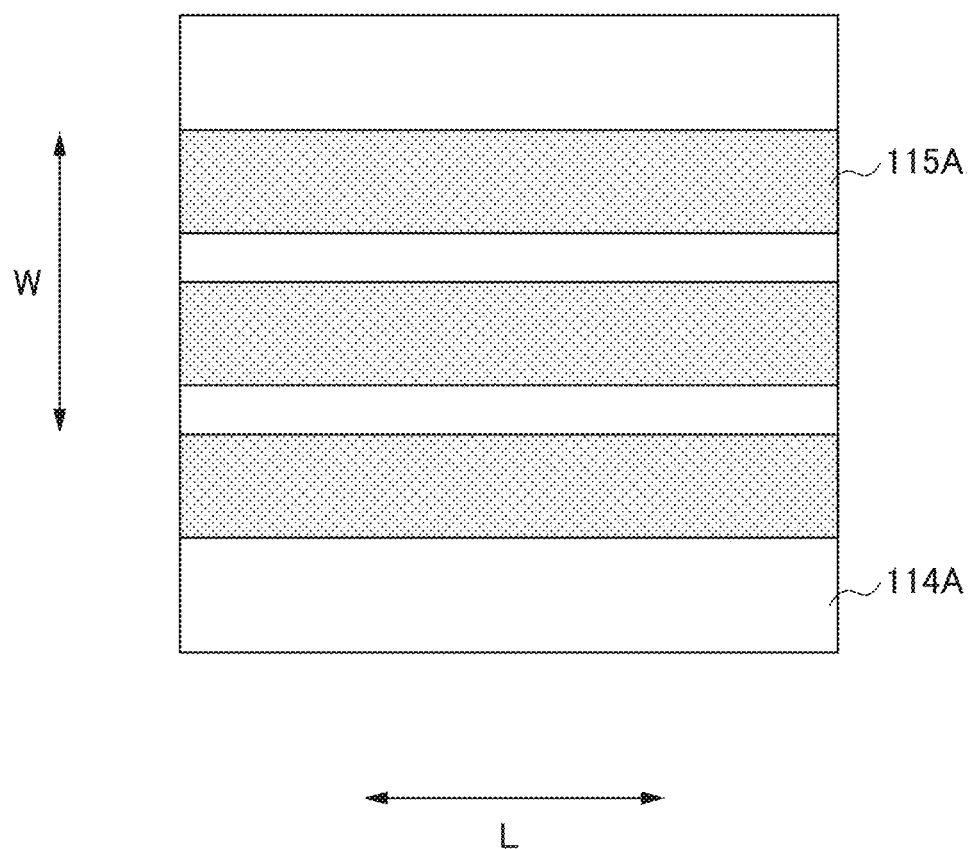
FIG. 8 is a process diagram explaining the method of manufacturing the multilayer ceramic capacitor 1.

Furthermore, as shown in FIG. 8, end-surface connecting internal electrode patterns 115A defining and functioning as the end-surface connecting internal electrode 15A by a conductive paste are formed on a first ceramic green sheet 114A defining and functioning as the dielectric 14c.

The end-surface connecting internal electrode patterns 115A each have a shape in which a plurality of end-surface connecting internal electrodes 15A are continuous in the length direction L, but not continuous in the width direction W.

The ceramic green sheet 114 is a strip-shaped sheet preferably obtained by forming a ceramic slurry containing a ceramic powder, a binder, and a solvent into a sheet on the carrier film using a die coater, a gravure coater, a microgravure coater, or other techniques.

The end-surface connecting internal electrode patterns 115A and the side-surface connecting internal electrode patterns 115B are preferably formed by printing such as screen printing, gravure printing, printing and relief printing, for example.

Ceramic Paste Providing Step S2

Figure 9:
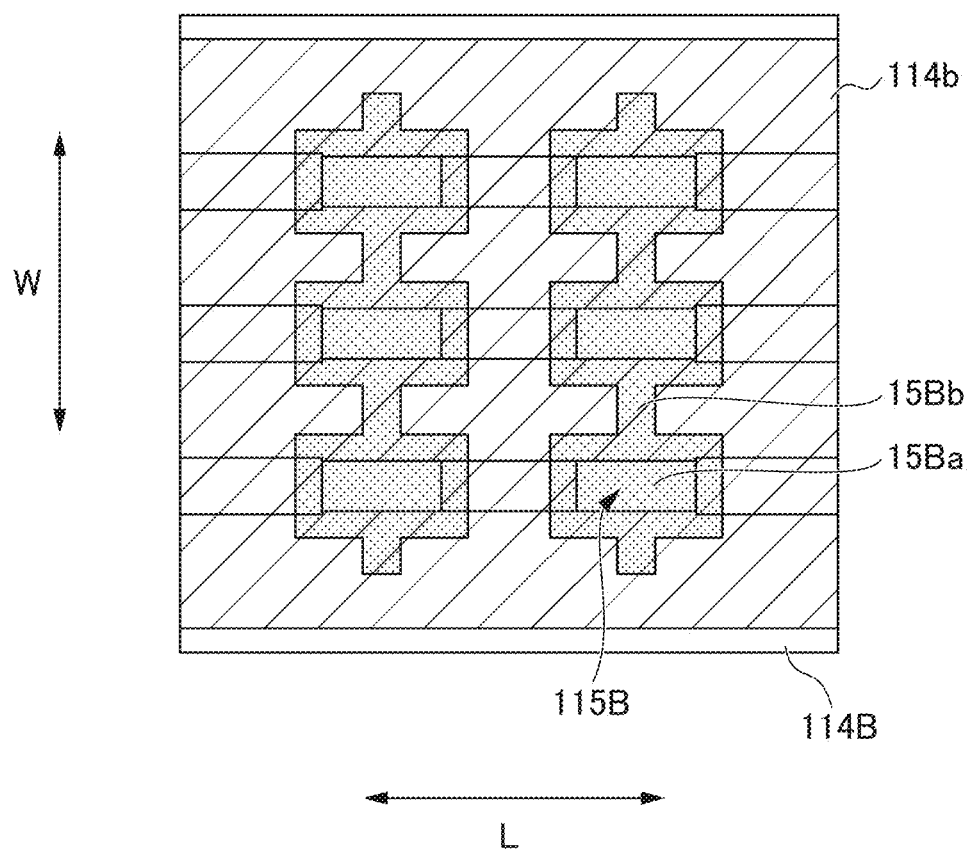
FIG. 9 is a process diagram explaining the method of manufacturing the multilayer ceramic capacitor 1.

Then, as shown in FIG. 9, a ceramic paste 114b defining and functioning as the dielectric 14b is provided on a sheet obtained by forming the side-surface connecting internal electrode patterns 115B on the second ceramic green sheet 114B shown in FIG. 7.

The ceramic paste 114b is provided at least at a portion defining and functioning as the side surface lead-out portion 15Bb of the side-surface connecting internal electrode 15B.

In the first preferred embodiment, the ceramic paste 114b entirely or substantially entirely covers the portion where the side-surface connecting internal electrode patterns 115B are not provided on the second ceramic green sheet 114B, and is further provided to overlap the entire or substantially the entire portion defining and functioning as the side surface lead-out portion 15Bb and the outer peripheral portion of a portion defining and functioning as the side surface opposing portion 15Ba. Conversely, the ceramic paste 114b defining and functioning as the dielectric 14b may be provided first, and the side-surface connecting internal electrode patterns 115B may be provided to overlap the dielectric 14b.

Figure 10:
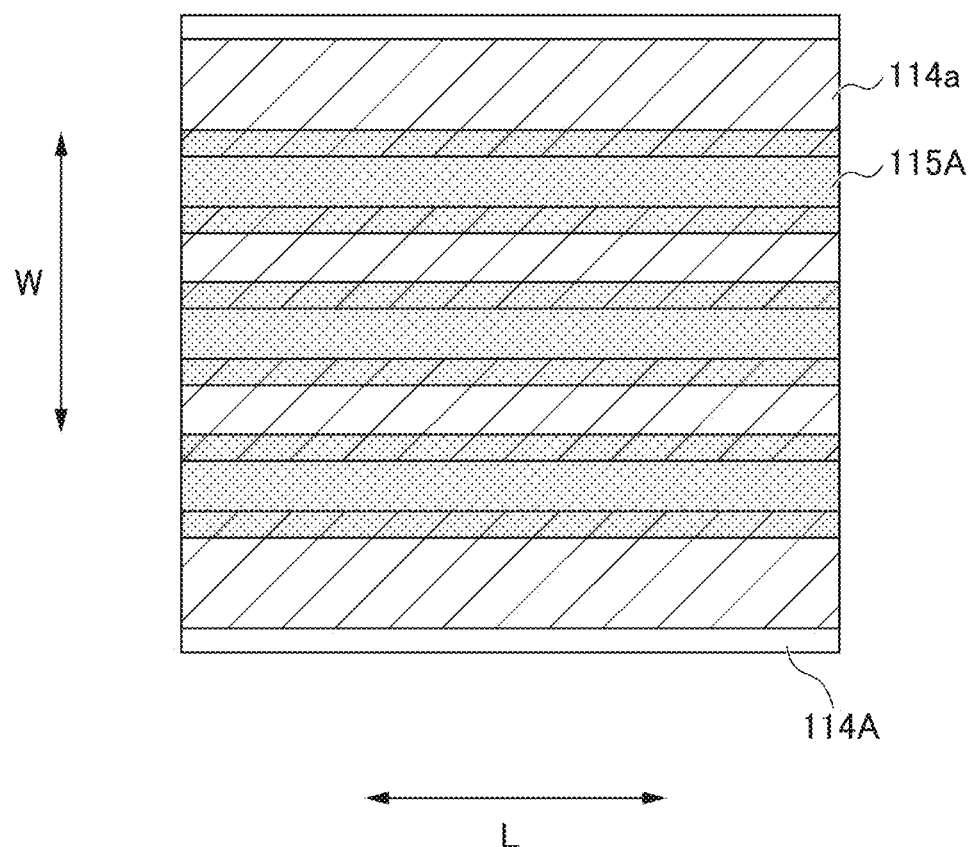
FIG. 10 is a process diagram explaining the method of manufacturing the multilayer ceramic capacitor 1.

As shown in FIG. 10, a ceramic paste 114a defining and functioning as the dielectric 14a is provided on a sheet obtained by forming the end-surface connecting internal electrode patterns 115A on the first ceramic green sheet 114A shown in FIG. 8.

The ceramic paste 114a is provided partially at least at a portion of the first ceramic green sheet 114A which overlaps the side surface lead-out portion 15Bb to which the ceramic paste 114b of the second ceramic green sheet 114B is applied when the second ceramic green sheet 114B is laminated.

In the first preferred embodiment, the ceramic paste 114a entirely or substantially entirely covers the portion where the end-surface connecting internal electrode patterns 115A are not provided on the first ceramic green sheet 114A, and is further provided to overlap the outer peripheral portion of the side-surface connecting internal electrode patterns 115A. Conversely, the ceramic paste 114a defining and functioning as the dielectric 14a may be provided first, and the end-surface connecting internal electrode patterns 115A may be provided to overlap the dielectric 14a.

It should be noted that either the dielectric 14b or the dielectric 14a may be provided individually.

It should be noted that the ceramic paste 114a and the ceramic paste 114b are applied by printing such as screen printing, gravure printing, and relief printing, for example. The ceramic paste may have different component ratios from the dielectric as the material of the ceramic green sheet 114, may have the same or substantially the same component ratio, or may include different components.

Laminating Step S3

Figure 11:
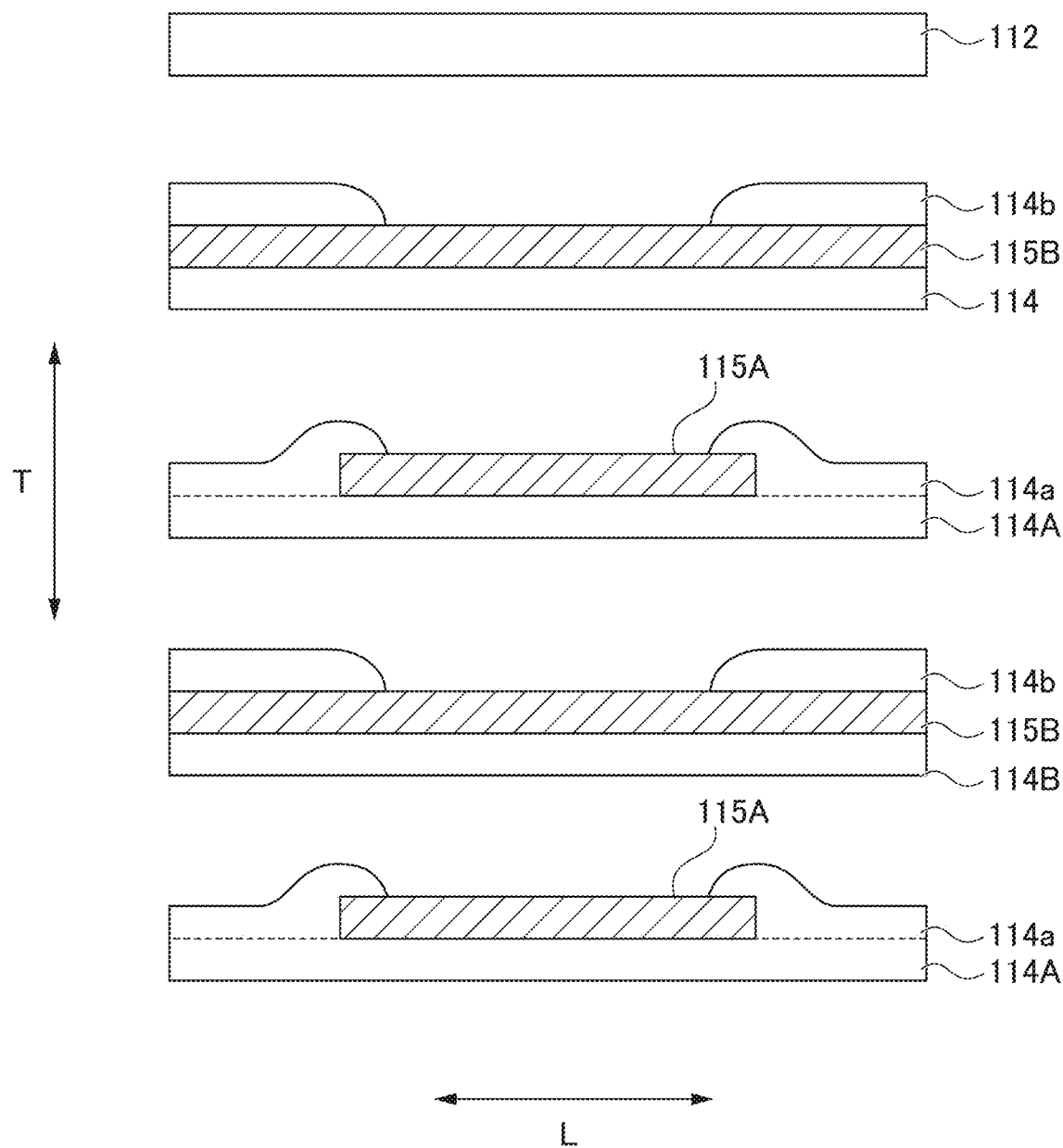
FIG. 11 is a process diagram explaining the method of manufacturing the multilayer ceramic capacitor 1.
Figure 12:
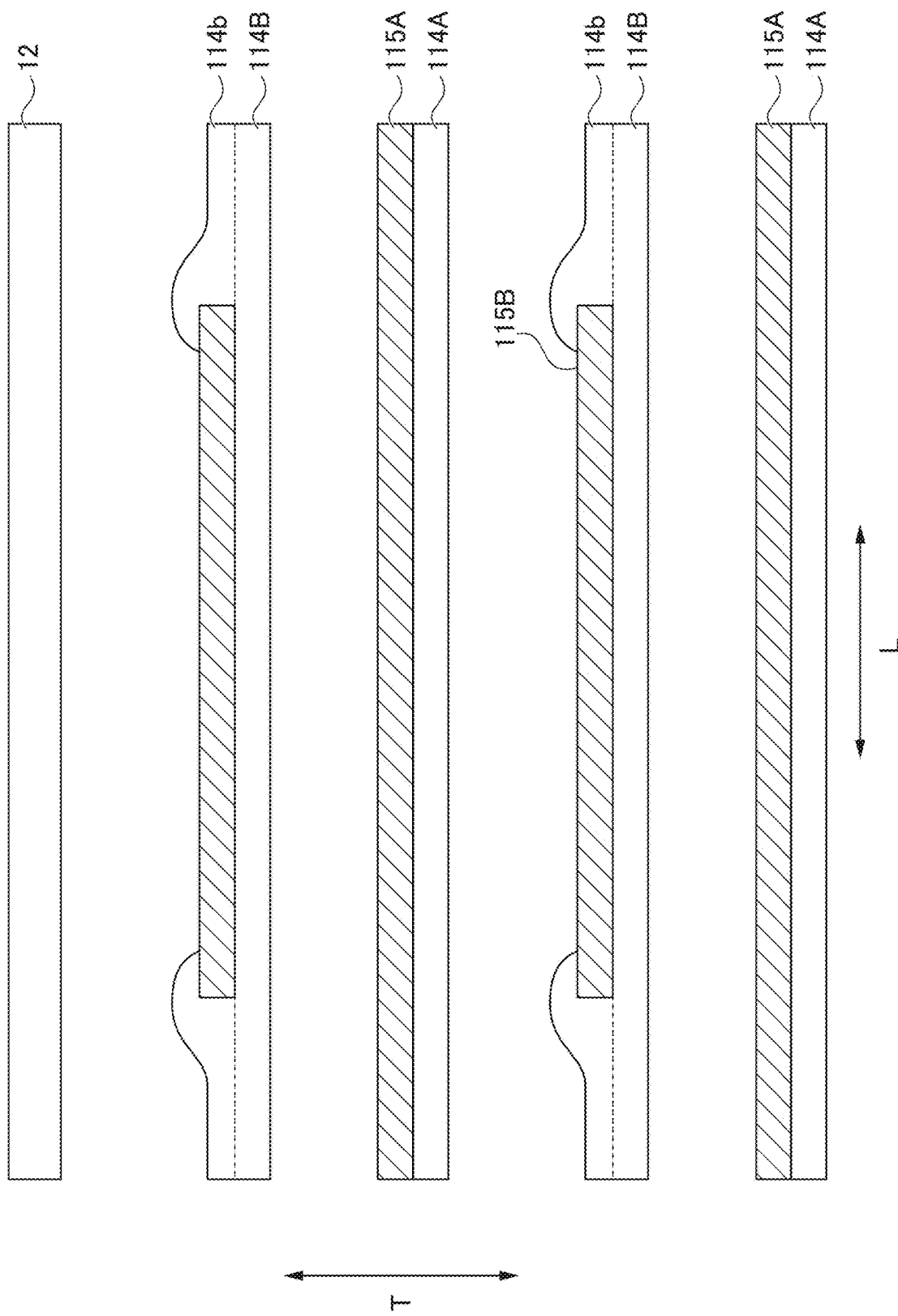
FIG. 12 is a process diagram explaining the method of manufacturing the multilayer ceramic capacitor 1.

FIG. 11 is a diagram explaining a stacked state of the multilayer body 2 in the WT direction. FIG. 12 is a diagram explaining a stacked state of the multilayer body 2 in the LT direction.

As shown in the drawings, a sheet in which the ceramic paste 114b defining and functioning as the side-surface connecting internal electrode pattern 115B and the dielectric 14b is provided on the second ceramic green sheet 114B shown in FIG. 9, and a sheet in which the ceramic paste 114a defining and functioning as the end-surface connecting internal electrode pattern 115A and the dielectric 14a is provided on the first ceramic green sheet 114A shown in FIG. 10 are alternately laminated.

Furthermore, outer layer portion ceramic green sheets 112 defining and functioning as the outer layer portion 12 are laminated on both sides of the resultant lamination in the lamination direction T.

Mother Block Forming Step S4

Subsequently, the outer layer portion ceramic green sheet 112 and a plurality of laminated sheets are subjected to thermocompression bonding to form a mother block.

Mother Block Dividing Step S5

Next, the mother block is cut and divided in the length direction L and the width direction W to manufacture a plurality of rectangular or substantially rectangular multilayer bodies 2.

As shown in FIG. 2 in this state, in the multilayer body 2, in the WT cross-section (first cross-section) passing through the width direction W and the lamination direction T at the middle portion in the length direction L, the multilayer body main surface A includes the side surface-raised portions MA, each raised toward the side surface B from the middle portion in the width direction W.

The side surface-raised portions MA are each provided at a portion on the multilayer body main surface A where both end portions of the side surface opposing portion 15Ba in the width direction W are located inside in the lamination direction T, and extend in the length direction L on the multilayer body main surface A.

Furthermore, as shown in FIG. 3, in the multilayer body 2, in the LT cross-section (second cross-section) passing through the length direction L and the lamination direction T at the middle portion in the width direction W, the multilayer body main surface A includes the end surface-raised portions NA, each raised toward the side surface C from the middle portion in the length direction L.

The end surface-raised portions NA are each provided at a portion on the multilayer body main surface A where both end portions of the end surface opposing portion 15Aa in the length direction L are located inside in the lamination direction T, and extend in the width direction W on the multilayer body main surface A.

External Electrode Forming Step S6

Next, the end-surface external electrodes 3 are formed on both end surfaces C of the multilayer body 2, and the side-surface external electrodes 4 are formed on both side surfaces B of the multilayer body 2.

The end surface lead-out portions 15Ab of the end-surface connecting internal electrode 15A are connected to the respective end-surface external electrodes 3. The end-surface external electrode 3 covers not only the end surface C, but also portions of the multilayer body main surface A and the side surface B in the vicinity of the end surface C.

The side surface lead-out portions 15Bb of the side-surface connecting internal electrode 15B are connected to the respective side-surface external electrodes 4. The side-surface external electrodes 4 cover not only the side surface B, but also a portion of the multilayer body main surface A in the vicinity of the side surface B.

Firing Step S7

Then, the resultant body is heated for a predetermined time in a nitrogen atmosphere at a set firing temperature. Thus, the external electrode 3 is fired on the multilayer body 2 to manufacture the multilayer ceramic capacitor 1 shown in FIG. 1.

In this way, the multilayer ceramic capacitor 1 is manufactured including the raised portions M which are raised on the two opposing main surfaces S in the lamination direction T so that the thicknesses in the lamination direction T of the one main surface and the other main surface with the middle portion interposed therebetween become larger as approaching the outer periphery of each of the main surfaces S from the middle portion.

As shown in FIG. 2 in this state, in the multilayer ceramic capacitor 1, in the WT cross-section (first cross-section) passing through the width direction W and the lamination direction T at the middle portion in the length direction L, the main surfaces S each include the side surface-raised portion MS raised toward the side surface B from the middle portion in the width direction W.

The side surface-raised portions MS are each provided at a portion on the main surface S where both end portions of the side surface opposing portion 15Ba in the width direction W are located inside in the lamination direction T, and extend in the length direction L on the main surface S.

Furthermore, as shown in FIG. 3, in the multilayer ceramic capacitor 1, in the LT cross-section (second cross-section) passing through the length direction L and the lamination direction T at the middle portion in the width direction W, the main surface S includes the end surface-raised portions NS, each raised toward the side surface C from the middle portion in the length direction L.

The end surface-raised portions NS are each provided at a portion on the main surface S where both end portions of the end surface opposing portion 15Aa in the length direction L are located inside in the lamination direction T, and extend in the width direction W on the main surface S.

Thus, the raised portion M is provided on the main surface S at the location where both end portions in the width direction W of the internal electrode 15 are present inside in the lamination direction T, and at the location where both end portions in the length direction L of the opposing portions 15a are present inside in the lamination direction T, by covering the peripheral portion of the internal electrode 15 with a ceramic paste to overlap the internal electrode 15.

Therefore, it is possible to manufacture the raised portion M easily and efficiently.

Furthermore, as shown in FIG. 2, the multilayer ceramic capacitor 1 thus manufactured includes four layers of the dielectrics such as the dielectric 14b, the dielectric 14c, the dielectric 14a, and the dielectric 14c, at the distance T1 between the side surface lead-out portions 15Bb adjacent to each other in the lamination direction T.

In the present preferred embodiment, the thickness of each of the dielectric 14a and the dielectric 14b made of the conductive paste and provided between the adjacent side surface lead-out portions 15Bb is preferably, for example, about 0.33 µm, and is more preferably about 0.15 µm or more and about 0.8 µm or less. The thickness of the dielectric 14c made of the ceramic green sheet 114 is preferably, for example, about 0.52 µm, and is more preferably about 0.3 µm or more and about 2.0 µm or less. Therefore, the distance T1 between the side surface lead-out portions 15Bb adjacent to each other is preferably about 0.9 µm or more and about 5.6 µm or less.

Furthermore, at the distance T2 between the side surface opposing portions 15Ba adjacent to each other in the lamination direction T, two layers of the dielectrics 14 and one layer of the internal electrode 15 (the end surface opposing portion 15Aa) such as the dielectric 14c, the end surface opposing portion 15Aa, and the dielectric 14c are provided.

In the present preferred embodiment, the thickness of the end surface opposing portion 15Aa is preferably, for example, about 0.48 µm, and is more preferably about 0.3 µm or more and about 0.8 µm or less. Therefore, the distance T2 between the side surface opposing portions 15Ba adjacent to each other is preferably about 0.9 µm or more and about 4.8 µm or less, for example.

Therefore, the distance T1 between the side surface lead-out portion 15Bb adjacent to each other is larger than the distance T2 between the side surface opposing portion 15Ba adjacent to each other in the lamination direction T.

Therefore, as described above, the distance between the side surface lead-out portions 15Bb is made larger than the distance between the side surface opposing portions 15Ba by the ceramic paste, such that it is possible to reduce the equivalent series inductance (ESL).

Second Preferred Embodiment

Next, a second preferred embodiment of the present invention will be described.

The second preferred embodiment differs from the first preferred embodiment in the range of the ceramic paste 114a and the ceramic green sheet 114c provided on the ceramic green sheet 114 on which the electrode pattern 115 is provided.

Figure 13:
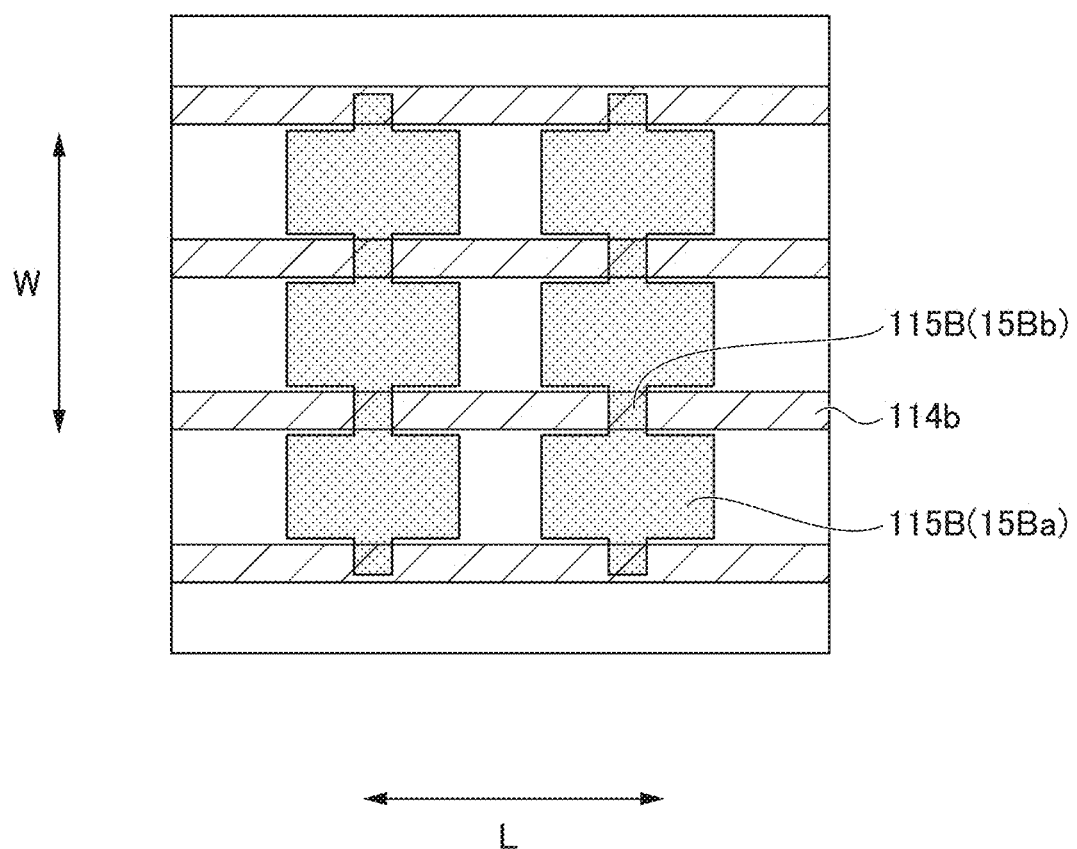
FIG. 13 is a diagram showing a state in which a ceramic paste 114b is provided on a ceramic green sheet 114 according to a second preferred embodiment of the present invention.

FIG. 13 corresponds to FIG. 9 according to the first preferred embodiment, and is a diagram showing a state in which a ceramic paste 114b defining and functioning as the dielectric 14b is provided on a sheet in which a side-surface connecting internal electrode pattern 115B is provided on the second ceramic green sheet 114B in the second preferred embodiment.

Figure 14:
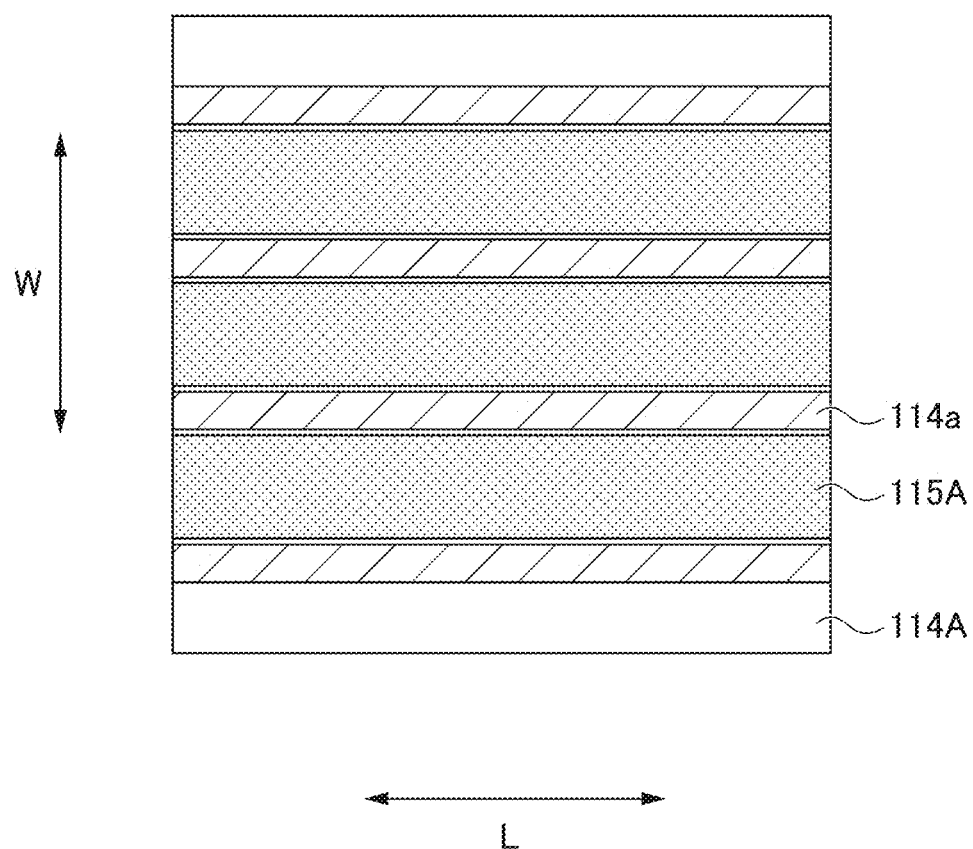
FIG. 14 is a diagram showing a state in which a ceramic paste 114a is provided on the ceramic green sheet 114 according to the second preferred embodiment of the present invention.

FIG. 14 corresponds to FIG. 10 according to the first preferred embodiment, and is a diagram showing a state in which a ceramic paste 114a defining and functioning as the dielectric 14a is provided on a sheet in which an end-surface connecting internal electrode pattern 115A is provided on the first ceramic green sheet 114A in the second preferred embodiment.

In the second preferred embodiment, the same reference numerals are used as the reference numerals indicating portions common to the first preferred embodiment.

As shown in FIG. 13, in the second preferred embodiment, similarly to the first preferred embodiment, a ceramic paste 114b defining and functioning as the dielectric 14b is provided on a sheet obtained by forming the side-surface connecting internal electrode patterns 115B on the ceramic green sheet 114 shown in FIG. 7.

At this time, the ceramic paste 114b covers a portion defining and functioning as the side surface lead-out portion 15Bb, and provided so as to extend in the length direction L.

However, the ceramic paste 114b does not cover the entire or substantially the entire surface of the side surface lead-out portion 15Bb, and there is a gap in the side surface lead-out portion 15Bb in the vicinity of the side surface opposing portion 15Ba between the side surface opposing portion 15Ba and the side surface lead-out portion 15Bb.

Furthermore, the ceramic paste 114b is not provided in the lateral portion in the length direction L of the side surface opposing portion 15Ba, and thus does not overlap the outer peripheral portion of the side-surface connecting internal electrode pattern 115B.

As shown in FIG. 14, in the second preferred embodiment, similarly to the first preferred embodiment, the ceramic paste 114a defining and functioning as the dielectric 14a is provided on a sheet obtained by forming the end-surface connecting internal electrode patterns 115A on the ceramic green sheet 114 shown in FIG. 8.

At this time, the ceramic paste 114a covers the end-surface connecting internal electrode pattern 115A, and extends in the length direction L. However, the ceramic paste 114b does not overlap the outer peripheral portion of the end-surface connecting internal electrode pattern 115A.

Figure 15:
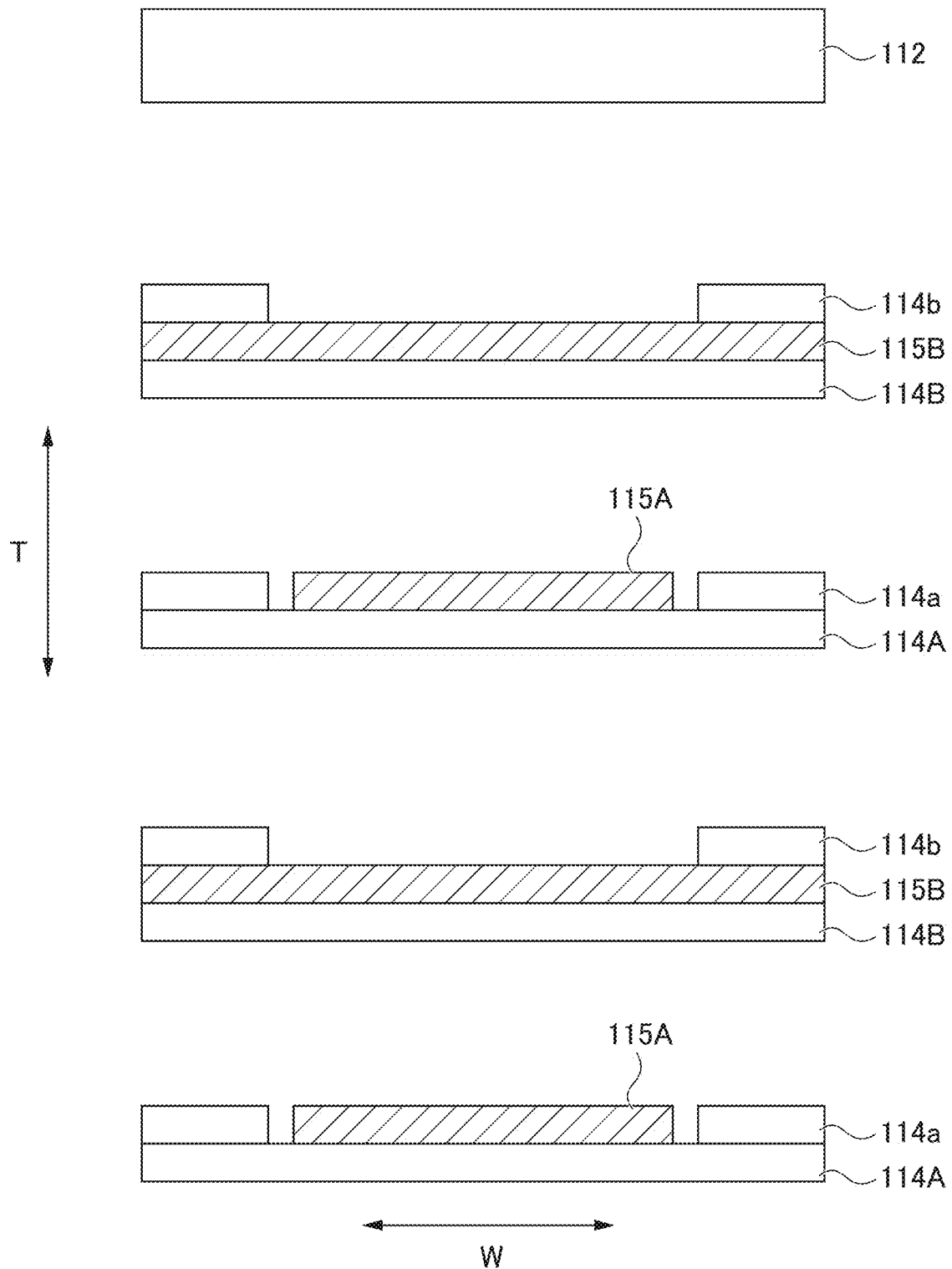
FIG. 15 is a diagram explaining a lamination state of a multilayer body 2 in Width Thickness (WT) directions in the second preferred embodiment of the present invention.
Figure 16:
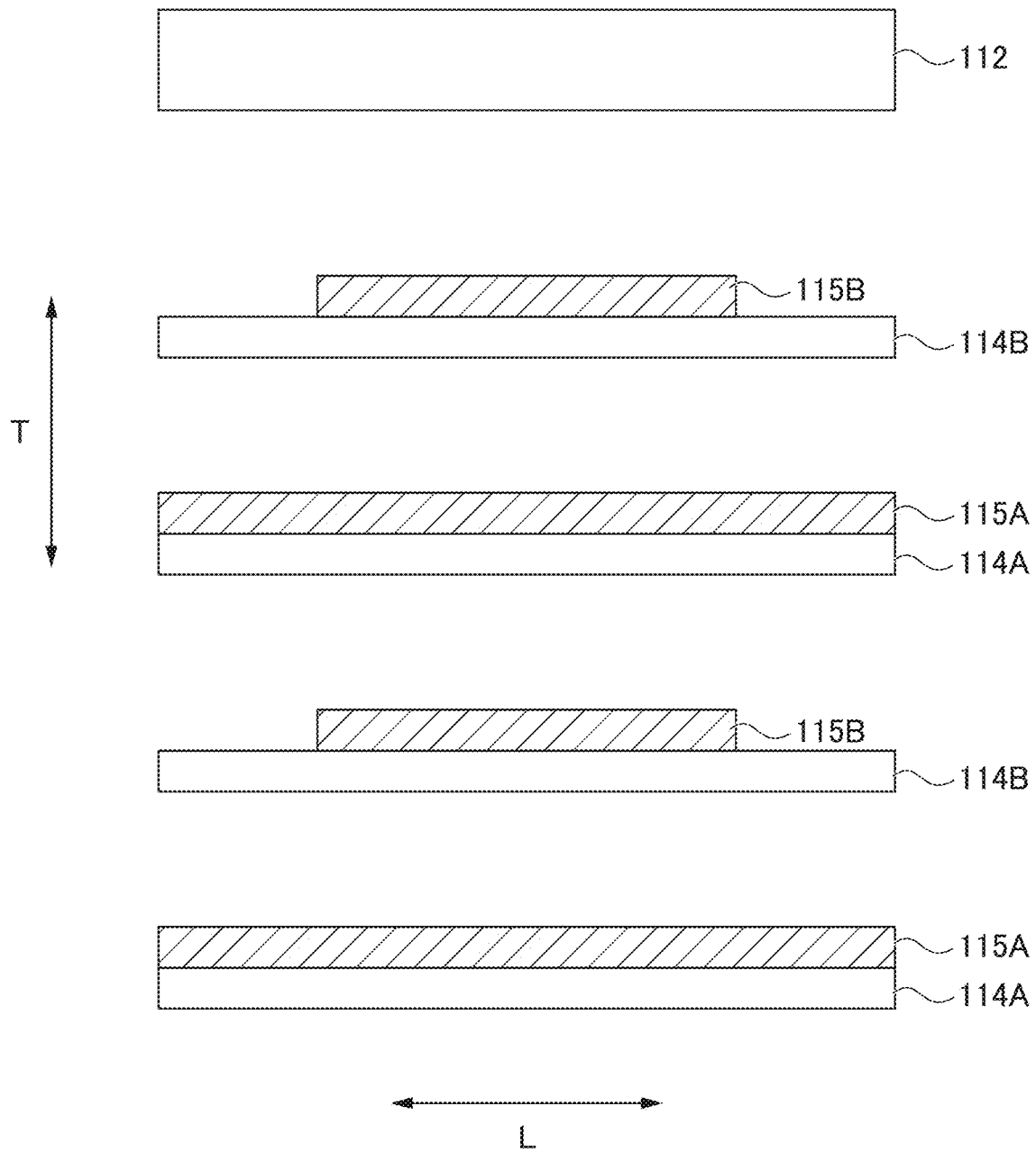
FIG. 16 is a diagram explaining a lamination state of the multilayer body 2 in Length Thickness (LT) directions in the second preferred embodiment of the present invention.

FIG. 15 is a diagram explaining a lamination state of a multilayer body 2 in a WT direction in the second preferred embodiment. FIG. 16 is a diagram explaining a lamination state of the multilayer body 2 in an LT direction in the second preferred embodiment.

As shown in the drawings, a sheet in which the ceramic paste 114a defining and functioning as the end-surface connecting internal electrode pattern 115A and the dielectric 14a is provided on the first ceramic green sheet 114A shown in FIG. 14, and a sheet in which the ceramic paste 114b defining and functioning as the side-surface connecting internal electrode pattern 115B and the dielectric 14b is provided on the second ceramic green sheet 114B shown in FIG. 13, are alternately laminated.

Furthermore, outer layer portion ceramic green sheets 112 defining and functioning as the outer layer portion 12 are laminated on both sides of the resultant lamination in the lamination direction T to form a mother block.

Then, similarly to the first preferred embodiment, the formed mother block is divided to form a multilayer body 2, end-surface external electrodes 3 are provided on both end surfaces C of the multilayer body 2, and side-surface external electrodes 4 are provided on both side surfaces B of the multilayer body 2 to manufacture a multilayer ceramic capacitor 1 through the firing step.

Figure 17:
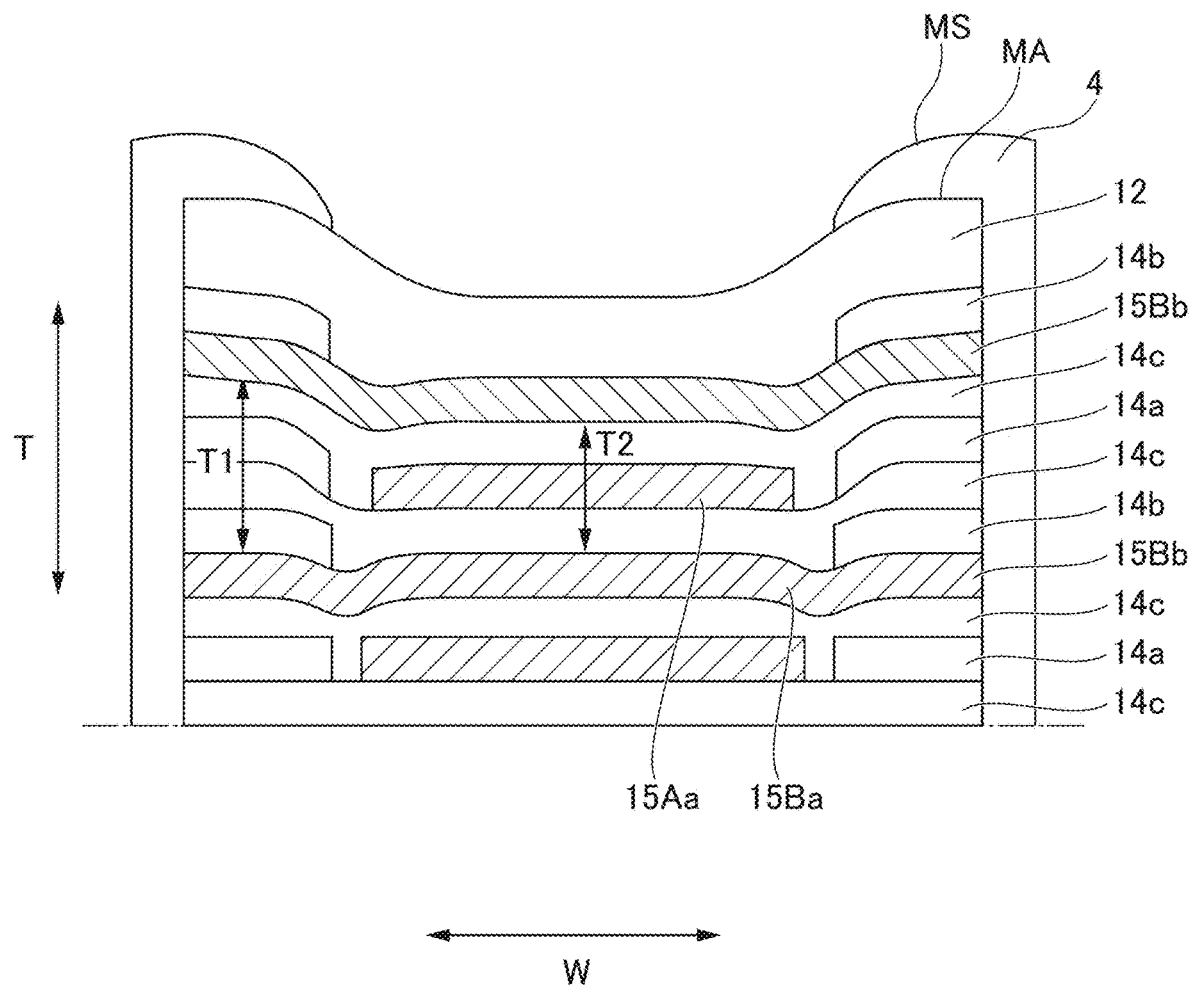
FIG. 17 is a WT cross-sectional view of a multilayer ceramic capacitor 1 of the second preferred embodiment of the present invention.
Figure 18:
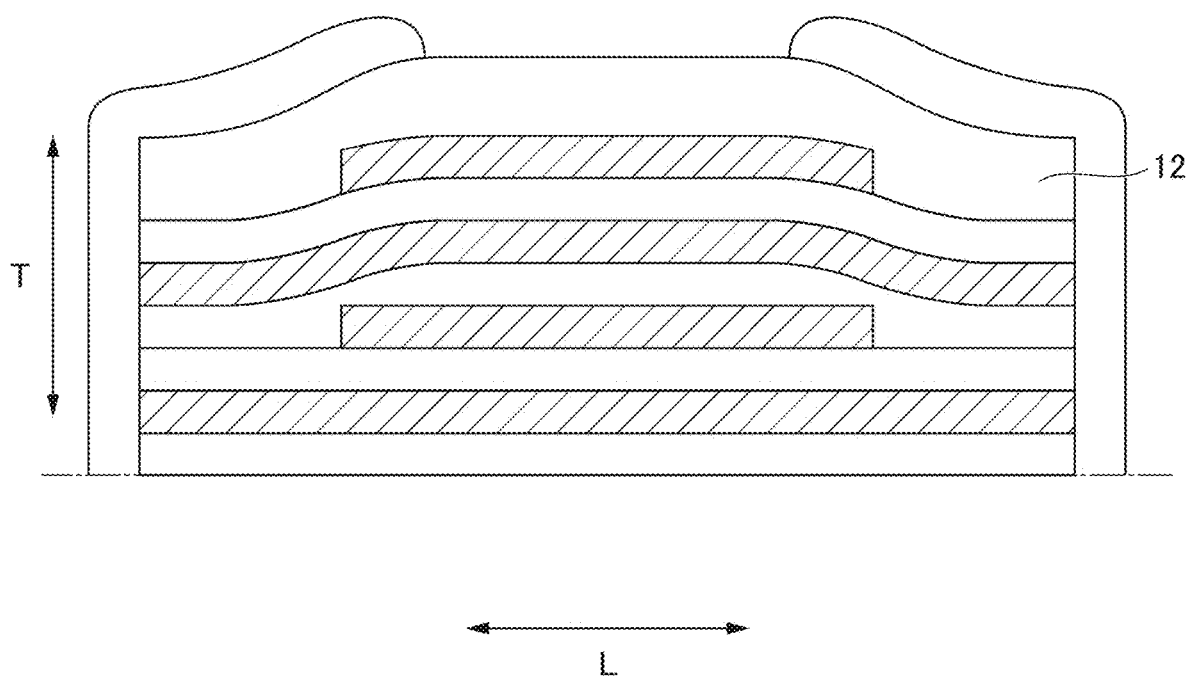
FIG. 18 is an LT cross-sectional view of the multilayer ceramic capacitor 1 of the second preferred embodiment of the present invention.

FIG. 17 is a WT cross-sectional view of the multilayer ceramic capacitor 1 manufactured in this way, and FIG. 18 is a LT cross-sectional view thereof.

The multilayer ceramic capacitor 1 of the second preferred embodiment includes four layers of the dielectrics such as the dielectric 14b, the dielectric 14c, the dielectric 14a, and the dielectric 14c, at the distance T1 between the side surface lead-out portions 15Bb adjacent to each other in the lamination direction T.

In the second preferred embodiment, the thickness of each of the dielectric 14a and the dielectric 14b made of the conductive paste and provided between the adjacent side surface lead-out portions 15Bb is preferably, for example, about 0.33 µm, and is more preferably about 0.15 µm or more and about 0.8 µm or less. The thickness of the dielectric 14c made of the ceramic green sheet 114 is preferably, for example, about 0.52 µm, and is more preferably about 0.3 µm or more and about 2.0 µm or less. Therefore, the distance T1 between the side surface lead-out portions 15Bb adjacent to each other is preferably, for example, about 0.9 µm or more and more preferably about 5.6 µm or less.

At the distance T2 between the side surface opposing portions 15Ba adjacent to each other in the lamination direction T, two layers of the dielectrics 14 and one layer of the internal electrode 15 (the end surface opposing portion 15Aa) such as the dielectric 14b, the end surface opposing portion 15Aa, and the dielectric 14c are provided.

In the second preferred embodiment, the thickness of the end surface opposing portion 15Aa is preferably, for example, about 0.48 µm, and is more preferably about 0.3 µm or more and about 0.8 µm or less. Therefore, the distance T2 between the side surface opposing portions 15Ba adjacent to each other is preferably, for example, about 0.9 µm or more and about 4.8 µm or less.

Therefore, the distance T1 between the side surface lead-out portion 15Bb adjacent to each other is larger than the distance T2 between the side surface opposing portion 15Ba adjacent to each other in lamination direction T.

Therefore, as described above, in the second preferred embodiment, the distance between the side surface lead-out portions 15Bb is made larger than the distance between the side surface opposing portions 15Ba, such that it is possible to reduce the equivalent series inductance (ESL).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including:
   two end surfaces opposing each other in a length direction intersecting a lamination direction;
   two side surfaces opposing each other in a width direction intersecting the lamination direction and the length direction;
   two main surfaces opposing each other in the lamination direction;
   internal electrodes including end-surface connecting internal electrodes and side-surface connecting internal electrodes provided in the lamination direction; and
   dielectrics alternately laminated with the internal electrodes in the lamination direction;
   end-surface external electrodes which are respectively provided at the two end surfaces of the multilayer body; and
   side-surface external electrodes which are respectively provided at the two side surfaces of the multilayer body; wherein
   in a cross section passing through the width direction and the lamination direction at a middle portion in the length direction, the multilayer body has a smallest dimension in the lamination direction in a middle portion of the multilayer body in the width direction;
   in the cross section passing through the width direction and the lamination direction at the middle portion in the length direction, one of the two main surfaces includes a raised portion which is raised from the middle portion in the width direction toward the respective side surfaces; and
   in the cross section passing through the width direction and the lamination direction at the middle portion in the length direction, the raised portion, the side surface, and the middle portion of the multilayer body in the width direction satisfy the following dimensional relationship in the lamination direction:
   the middle portion of the multilayer body in the width direction<the side surface<the raised portion.

2. The multilayer ceramic capacitor according to claim 1, wherein, in the cross section passing through the width direction and the lamination direction at the middle portion in the length direction, the side-surface connecting internal electrodes are connected to each of the side-surface external electrodes.

3. The multilayer ceramic capacitor according to claim 1, wherein the side-surface external electrodes cover at least a portion of the raised portion.

4. The multilayer ceramic capacitor according to claim 1, wherein the side-surface external electrodes cover at least a portion of an apex of the raised portion.

* * * * *